Figure 1:
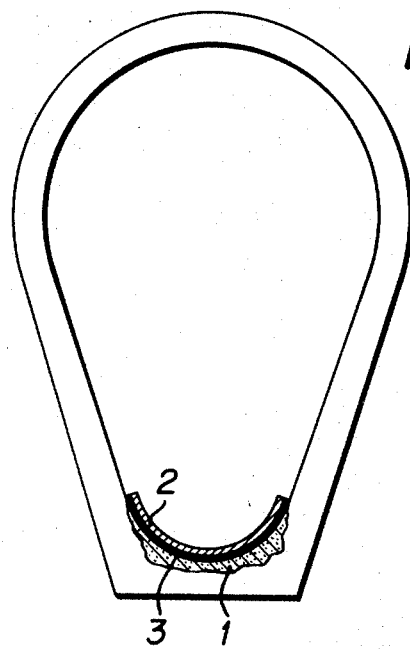

United States Patent
Merminod

[15] 3,654,014
[45] Apr. 4, 1972

[54] PROCESS FOR PROTECTING A WALL SUBJECTED TO WEAR

[72] Inventor: Charles Merminod, Geneva, Switzerland

[73] Assignee: Societe Anonyme Conrad Zschokke, Geneva, Switzerland

[22] Filed: June 18, 1969

[21] Appl. No.: 834,371

[30] Foreign Application Priority Data

July 5, 1968 Switzerland ..................... 10122/68

[52] U.S. Cl. .................................. 156/215, 138/98, 156/214
[51] Int. Cl. .................................................. F16l 55/18
[58] Field of Search .................. 156/196, 214, 215, 79, 39, 156/40, 41, 42; 138/98, 97

[56] References Cited

UNITED STATES PATENTS

| | | | |
|---|---|---|---|
| 2,281,591 | 5/1942 | Moore | 156/42 X |
| 2,390,632 | 12/1945 | Abrams et al. | 156/214 X |
| 2,703,299 | 3/1955 | Seymour et al. | 156/215 |
| 2,828,800 | 4/1958 | Hopkins et al. | 156/215 |
| 3,290,199 | 12/1966 | Willhoite | 156/215 |
| 3,424,203 | 1/1969 | Rubenstein | 138/98 |

Primary Examiner—Benjamin A. Borchelt
Assistant Examiner—G. E. Montone
Attorney—Saul Jecies

[57] ABSTRACT

This invention relates to a process for protecting a non-flat wall exposed to wear consisting in providing a coating made of a mortar containing synthetic resin on at least part of the surface to be protected. Accordingly one subjects prefabricated protective elements made of a mortar containing synthetic resins to a deformation, so that they adjust better to the form of at least part of the surface to be protected, one fastens these elements to said surface and one points flat the joints of adjacent coating elements.

13 Claims, 6 Drawing Figures

Patented April 4, 1972

3,654,014

3 Sheets-Sheet 1

Inventor
Charles Merminod

Patented April 4, 1972 3,654,014

3 Sheets-Sheet 2

Inventor

Charles Merminod

Inventor
Charles Merminod

PROCESS FOR PROTECTING A WALL SUBJECTED TO WEAR

In canalizations for waste water, the continuously increasing content of chemicals from industry and household produces an ever increasing corrosion. When building new sewers, one provides them more and more with protective coatings made of various materials. Such materials include PVC or polyethylene sheets of a thickness of 1 to 20 mm., coatings made of pure, charged or stratified synthetic resins, coatings made by "guniting," applications of cement mortars which are particularly resistant to corrosion, bituminous mortars, and finally coatings made of prefabricated moulded elements, fitted before or after the setting up of the elements of the duct.

The corrosion of a great number of old ducts has reached, in some cases, several tenths of a centimeter in depth, which necessitates an immediate repair. In principle, after derivation of the water, all the processes mentioned with regard to new ducts are applicable to old ducts, after reshaping them to their original outline by patching them up with concrete or mortar before the coating is laid on.

A mortar using synthetic resins as binders is probably one of the most convenient materials for producing prefabricated coating elements, in view of its great resistance to abrasion of its inorganic granulometric structure (quartz, basalt, corundum, etc.) allied with the resistance to chemicals of some of the synthetic binders. These prefabricated coatings are, however, expensive since complicated moulds are required for their production, which are difficult to handle and must correspond to the various standardized profiles (avoid, round). Moreover, and in view of their age, ducts to be repaired have frequently interior dimensions which are different from the newer standardized ones.

The object of the present invention is to provide a process for protecting a non-flat wall exposed to wear, this process consisting in providing a coating made of a mortar including synthetic resin on at least part of the surface to be protected, distinctive in that one subjects prefabricated protective cladding elements made of a mortar containing synthetic resin to a plastic deformation, so that they adjust better to the form of at least part of the surface to be protected, that one fastens these elements to said surface and that one points the joints of adjacent coating elements.

The attached drawing shows schematically and by way of example, different applications of the process of the invention.

Figure 3:
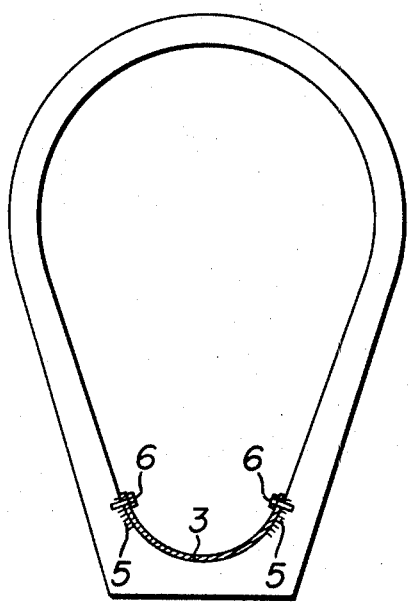
Figure 2:
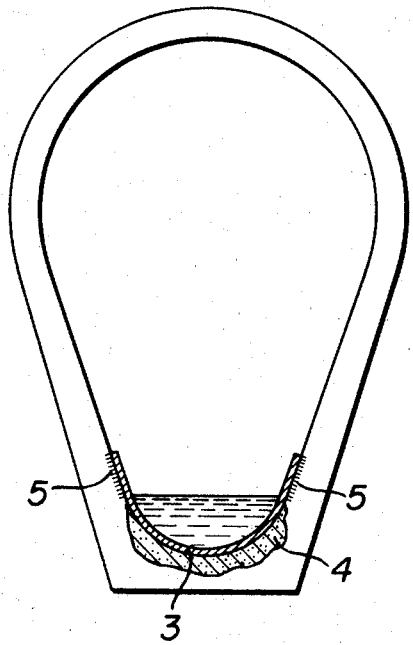
Figure 4:
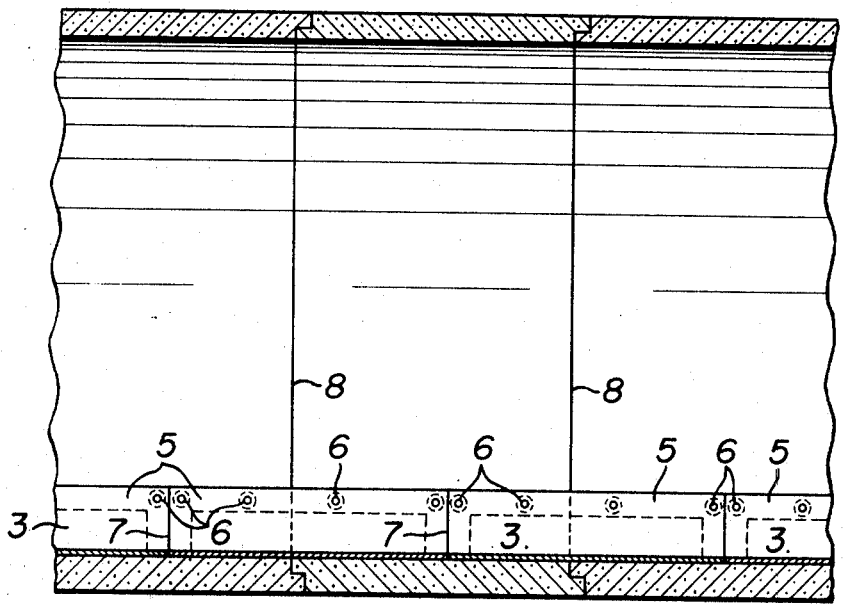
Figure 5:
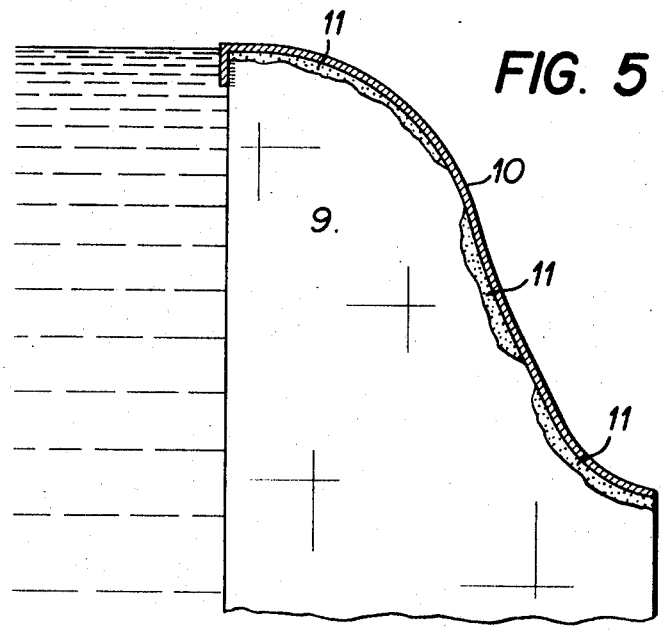
Figure 6:
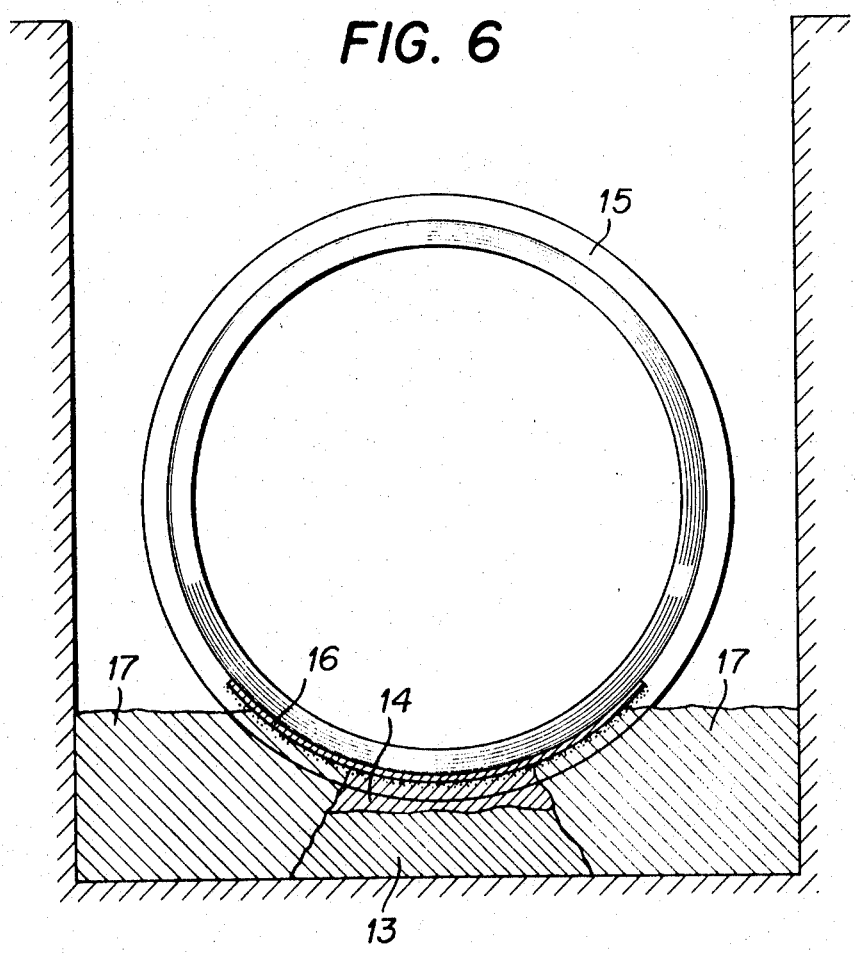

FIG. 1 is a partial section of a sewer repaired according to the prior-art process;

FIG. 2 is a partial section of a sewer repaired by the process of the invention, FIGS. 3 and 4 are respectively a cross section and a longitudinal section of a new duct protected by the process of the invention, FIG. 5 is a sectional view of a weir, the downward section of which is protected by the present process; and FIG. 6 is a sectional view of a duct produced by pneumatic casting and protected by the present process.

FIG. 1 of the attached drawing shows the present method of repair of a used canalization. This operation is sometimes difficult and always expensive. First of all the water flowing through the section of the duct to be repaired has to be detoured. Once the duct is dry, the eroded holes have to be filled with a coating of mortar 1, the surface of which has to be shaped to conform to the shape of a prefabricated channel 2 which will constitute the wear resistant coating of the repaired duct. This channel is supported by tags made of quickly setting cement and the free space of approximately 1 cm. is subsequently filled by injecting colloidal mortar 3.

The present process consists in producing flat protecting elements, on vibrating or non-vibrating tables and to give them their final shape after they have been allowed to harden for some time. The same element may also be deformed after hardening is completed by heating it before forming it. In view of this deformability, these elements may be inserted into ducts of various cross sections, including those of non-standardized cross sections. This adaptability to the shape of the supporting member permits one to adhere the elements to the supporting concrete with an adhesive. Since the protecting elements may be well adjusted to the configuration of the supporting member, the quantity of adhesive required is reduced which, when considering the relatively high price of the adhesive, makes this method of fastening still economically possible. Since various elements may be fastened to the supporting member and between themselves with adhesive which sets perfectly under water, it is possible to coat ducts without diverting the water (see FIG. 2), which reduces considerably the expenses when repairing a worn duct.

In practice, the hardening of the elements is achieved by using synthetic resins showing a very progressive polymerization or polyaddition. The speed of this reaction may be adjusted within limits by the use of catalizers or delaying agents or more simply by adjusting the ambient temperature when producing the elements.

A duct (FIG. 2) may be repaired and renovated by the present process without the necessity in some cases to divert the water running therethrough. In fact, one takes the protecting elements while they may still be deformed, and shapes them until achieving an outline permitting one to adapt them to the bottom of the duct. One then applies these elements against the not yet corroded side walls of the duct and secures them by gluing, screwing, etc. The adjacent elements are glued together by means of an adhesive which sets under water. The water then being isolated from the open space remaining between the protecting element 3 and the worn bottom 4 of the duct, this open space is filled by injection of colloidal mortar.

Thus, thanks to the deformability of the protecting elements 3 which enables them to conform at least partly to the internal surface of the duct to be reconditioned, whatever its profile may be, it is possible to proceed with the repair without diverting the water passing through the duct and without having to form at the bottom of the duct a support having necessarily a shape corresponding to the one of rigid prefabricated elements.

It is clear that the protective elements 3 should be handled carefully when being set up and until they have hardened completely, namely one must avoid walking on them so as not to deform them.

The protective elements 3 are adhered on a band 5 approximately 10 cm. wide at each side by means of an adhesive, for example of polyurethane base, if the duct is dry, or of epoxy resin base if the duct is moist. The same adhesive can be used to point flat i.e. to fill in the mutual joints of the protective elements 3.

In order to make the protective element adhere with more security to the side wall of the duct, screws may be provided.

Usually, the joints of the protective elements are offset with respect to the joints of the duct to give additional assurance of tightness.

FIGS. 3 and 4 illustrate the protection of a new duct. In this case the protecting elements 3 are plastically deformed when being set up, so as to conform with the internal bottom surface of the duct. The fastening of these elements 3 is also ensured by gluing at 5 and screwing at 6, and the joints 7 of the elements 3 are offset with respect to joints 8 of the duct.

In the embodiments of FIGS. 2 to 4 the protective elements 3 could for instance be obtained by the following mixture:

| (Formula 1): | | |
|---|---|---|
| "Desmophen 1150" | 12.5 % | |
| "Desmodur VL" | 6 % | |
| "Zeolith" (paste containing 50 % of castor oil) | 4 % | |
| Quartz 0.7 to 1.2 mm. | 27 % | |
| Quartz 1.5 to 2.5 mm. | 27 % | |
| Corundum 300 | 23.5 % | |

These components are intimately mixed and spread out on a perfectly plane and smooth table, treated with a lifting agent such as for example a solution of Carnouba wax in White Spirit.

The thickness is adjusted to 1 centimeter and the surface smoothed. Where a mass production is required, the table top is put in storage with the element for 24 hours and the production resumed with a new table top. Through vibration the density of the element may be increased and this also permits to increase the speed of production. In case a shorter lifting time is required, a small percentage of dibutyltin dilaurate is added to the mixture.

The adhesive for securing the elements on the duct and pointing the joints between the protective elements may have, for example, the following composition:

| (Formula 2): | "Eponal" 313 | 3 parts |
|---|---|---|
| | Hardener B 813 E | 2 parts |

The protective elements may be glued to the bottom of the duct along the full length of their free edge at a right angle to the joint.

FIG. 5 illustrates a water weir which is renovated by the present process. For this purpose it is rarely possible to produce on the site the required protective elements and one has, therefore, to proceed differently. One produces flat protective elements and lets them harden completely before delivering them to the site. Before setting them up they are heated, for example, by immersion in warm water at 80° C., which gives them enough plasticity for permitting the plastic deformation when setting them up finally. Once cooled, the elements regain the rigidity and the hardness which renders the coating corrosion-proof.

For this special use, the protective elements are produced as indicated before from a mixture having, for example, the following composition:

| (Formula 3): | "Desmophen 550 U" | 5 % |
|---|---|---|
| | "Desmodur VL" | 7 % |
| | "Zeolith" (paste containing 50 % of castor oil) | 5 % |
| | Corundum 300 | 3 % |
| | Corundum 0.1 to 3 mm. | 60 % |

Then a layer of 5 to 7 mm. thickness of the following mixture is applied thereon:

| (Formula 4): | Crushings 3 to 6 mm. | 95 % |
|---|---|---|
| | "Desmophen 550 U" | 2 % |
| | "Desmodur VL" | 2 % |
| | "Zeolith" (paste containing 50 % of castor oil) | 1 % |

This layer provides an anchoring surface ensuring the binding with proper gluing mortar.

The preparation of the supporting element and the positioning of the protective elements are performed as follows:

1. Diversion of the water.
2. Cleaning of the supporting element concrete if it is soiled, for example, by weed or moss deposits.
3. In a vat of larger dimension than the plates, the latter are heated in water at 80° C.
4. Each plate is applied at the desired place of the supporting element and given the desired form by plastic deformation.
5. The elements are allowed to cool in that position.
6. After withdrawing the hardened element, a layer of adhesive for wet surfaces, for example, of the following composition, is applied on the concrete:

| (Formula 2): | "Eponal 313" | 3 parts |
|---|---|---|
| | Hardener B 813 E | 2 parts |

7. One prepares a synthetic mortar, the grain size of which corresponds to the free space to fill, for example:

| (Formula 5): | "Eponal 313" | 3 parts |
|---|---|---|
| | Hardener B 813 E | 2 parts |
| | Dry sand, 0 to 1 mm. | 8 parts | or the following mixture:

| (Formula 6): | Sand 0 to 3 mm. | 5 parts |
|---|---|---|
| | Special Portland cement | 3 parts |
| | "Rhodocim" emulsion | 1 part |
| | Water for required consistency | |

8. One coats the element and the weir while ensuring that all free spaces are filled and one applies the element in its position.
9. While the work progresses, the elements are connected at their joints by means of an adhesive corresponding, for example, to Formula 2 or 5.
10. The stability of the elements may by improved while setting them up by means of wooden riders glued over the edges of two adjacent elements by means of a quick setting binder, for example:

| (Formula 7): | "Rhodester 3016 BL" | 94 % |
|---|---|---|
| | Benzoyl peroxide 50 % in a plastifier | 4 % |
| | Dimethylaniline (10 % solution in styrene) | 2 % |

In some cases and in order to ensure a good adherence of the elements to the support, the elements may be provided with a gravelled anchoring surface, i.e., including gravels in the synthetic mortar mass and protruding from its surface.

Thereby the weir 9 is provided with a new covering 10 resilient to abrasion and to chemical attacks and the cavities from previous corrosions are filled with synthetic mortar 11.

Finally FIG. 6 illustrates diagrammatically the construction of a duct by pneumatic casting.

In this case the protective elements may be produced with a mixture according to Formula 3 and after spreading the mortar on the vibratory table, adjustment of its thickness and vibration, one applies on the fresh mortar the following mixture:

| (Formula 8): | Crushings 9 to 12 mm. | 95 % |
|---|---|---|
| | "Desmophen 550 U" | 2 % |
| | "Desmodur VL" | 2 % |
| | "Zeolith" (paste with 50 % castor oil) | 1 % | which ensures the subsequent binding with the supporting concrete.

The elements are stored until use.

The construction of the duct and the setting up of its elements are performed as follows:

The elements are heated to approximately 80° C. by means of a water bath, hot air, infra red rays, etc. and subsequently applied on a tamplate corresponding to the desired form of the bottom of the duct. After cooling off, the thus shaped shells may be stored or set up immediately in the duct which comprises a dry concrete slab 13 to adjust the slope, cement mortar 14 to fasten the elements and the circular casings 15, the protective elements set up at the precise slope and after hardening of the elements 16 the normal concrete work of the side parts 17.

Further possible applications of the described process include for instance the following:

After having produced the protective elements flat, one may shape them according to the surface they will cover, not by applying them directly against said surface but by forming them on a template or mould of corresponding shape. Once the elements have hardened, they may be stored in their final shape or set up immediately.

According to the latter application, the present process permits the prefabrication of protective elements having very complex shapes without need of corresponding moulds, on light templates which are easy to produce.

In addition to the already mentioned advantages this process permits, due to the production in a flat form of the protective elements, to give to the protective elements a higher density and to increase their resistance to wear.

The choice of the components of the mixture from which the elements are made and of the relative proportions of these components may be greatly varied as long as the element which is produced flat presents still, after some time, a ductility which is sufficient and long-lasting enough to permit its forming or else may still be elastically deformed for some time provided it is heated up.

By varying the composition of the mixture from which the protective elements are made, it is possible to vary the characteristics of these elements in the following limits for example:

| | |
|---|---|
| Modulus of elasticity | from $10^2$ to $3.10^5$ kg./cm.$^2$ |
| Stretching | from 100 % to 0.1 % |
| Resistance to flexion | up to 600 kg./cm.$^2$ |
| Resistance to compression | up to 1,200 kg./cm.$^2$ |

I claim:

1. A process for providing a protective covering on a contoured surface of a wall exposed to wear, comprising the steps of providing a substrate; depositing on a flat surface of said substrate a layer of hardenable mortar containing synthetic resin binder; removing the layer from said substrate after at least partial setting of said binder and hardening of said mortar; shaping the layer to the contour of said surface to thereby obtain a prefabricated cladding element; placing a requisite number of such cladding elements on said surface adjacent to one another so that they define respective joints; fastening said cladding elements to said wall; and pointing the respective joints between adjacent ones of said cladding elements.

2. A process as defined in claim 1, wherein the step of shaping said layer is carried out after complete hardening of said mortar.

3. A process as defined in claim 2, wherein the step of shaping said layer after complete hardening of said mortar comprises heating the cladding element until plastically deformable, and thereupon shaping the cladding element to the contour of said surface.

4. A process as defined in claim 1, wherein the step of shaping said layer comprises placing said layer into contact with said surface, and deforming it to assume the contour of said surface.

5. A process as defined in claim 1, wherein the step of shaping said layer comprises providing a template having a face whose contour corresponds to that of said surface; placing said layer onto said face; and deforming said layer to assume the contour of said face.

6. A process as defined in claim 5, wherein the step of shaping said layer is carried out after complete hardening of said mortar; and further comprising the step of heating said layer until plastically deformable, prior to deforming said layer to assume the contour of said face of said template.

7. A process as defined in claim 1, wherein the step of fastening said elements to said wall comprises adhesively securing said elements to said surface; and further comprising the step of adhesively securing adjacent ones of said elements to one another.

8. A process as defined in claim 1, said elements and said surface defining between themselves at least some free spaces; and further comprising the step of injecting colloidal mortar between said elements and said surface for filling said free spaces.

9. A process as defined in claim 1, wherein the step of fastening said elements comprises applying a mortar containing synthetic resin between and in contact with said surface and said elements.

10. A process as defined in claim 1, said layer having two major surfaces; and further comprising the step of gravelling one of said major surfaces while producing said layer.

11. A process as defined in claim 1, wherein the step of fastening said cladding elements to said surface comprises adhering said elements to said surface with a synthetic plastic adhesive hardenable in the presence of liquid.

12. A process as defined in claim 1, wherein the quantity of synthetic resin binder is less than 30 percent of the total quantity of said mortar.

13. A process as defined in claim 1, wherein said layer has a thickness of at least 5 mm.

* * * * *